Patented Apr. 16, 1935

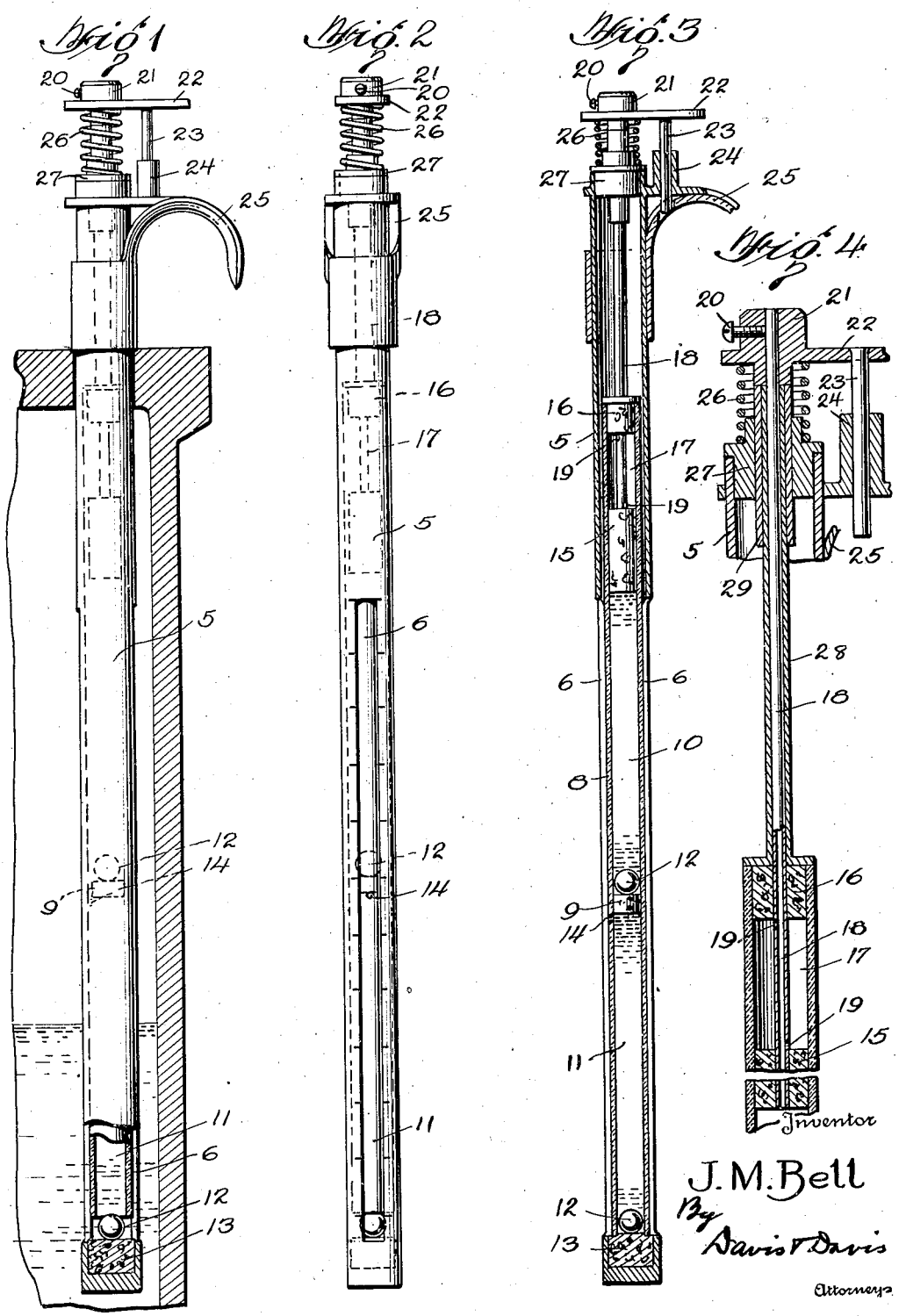

1,997,960

UNITED STATES PATENT OFFICE 1,997,960

VISCOSIMETER

John Montgomery Bell, Chester, S. C.

Application May 19, 1934, Serial No. 726,568

6 Claims. (Cl. 265—11)

The object of this invention is to provide a simply-constructed viscosimeter for testing a sample oil taken from a receptacle such as the crankcase of an automobile with a standard or norm sample of oil permanently carried by the implement, this implement being of rod-like form in order that it may be dipped into the crank-case in the manner of an ullage rod and thus in addition to testing viscosity show the depth of the oil in the crank-case, in the same manner as the graduated rods now in general use for this purpose.

In the drawing annexed, Fig. 1 is a side elevation of my device, partly in section, showing it hung or suspended in a crank-case;

Fig. 2 is a side elevation of the device;

Fig. 3 is a vertical central sectional view; and

Fig. 4 is a detail vertical central sectional view of the upper part of the device.

Referring to the drawing annexed by reference characters, 5 designates a long metallic tubular rod having its lower end closed and provided along its length with a pair of oppositely-arranged slots 6, the upper part of the tube 5 being desirably imperforate and provided at its extreme upper end with a rigid finger-hook or handle 25. Enclosed within the metal tube 5 is a glass tube 8 which is provided at a suitable point in its length with two chambers by means of an imperforate partition 9, the upper chamber 10 being adapted to hold a quantity of standard or norm oil against which is to be tested a sample of oil to be introduced into the lower chamber 11, each one of these chambers being provided with a non-buoyant body 12 having the same diameter and weight and being preferably spherical.

The glass tube 8 is adapted to slide up and down within the tube 5, and when it is down its lower end seats against a valve-seat 13, preferably made of cork and enclosed and embraced tightly by the tube 5 and abutting against the lower closed end thereof. When the tube is thus pressed down against the cork the oil in the sample chamber 11 is trapped therein. To fill this sample chamber with oil, the glass tube 8 is raised upwardly a short distance, shown in Figs. 1 and 2, and the rod-like implement is dipped into the body of oil to be tested, whereupon the oil flows up into the sample chamber 11 until it is stopped by the partition 9. To facilitate the flowing in of the oil the sample chamber 11 is provided with an air-escape hole 14 adjacent the partition 9. After the sample of oil is taken into the chamber 11 the tube 8 is forced downwardly against the seat 13 and the oil is thus trapped in the chamber and will be removed from the vessel when the implement is removed therefrom. The two chambers 10 and 11 are of the same diameter and preferably of the same length. When a sample of oil is thus taken from the crank-case or other receptacle the viscosity of the two bodies of oil may be compared by simply tilting the rod-like implement to an angle beyond the angle of repose, with the lower end uppermost, whereupon the two non-buoyant balls 12 will sink toward the opposite ends of the respective chambers 10 and 11. By comparing the relative speeds of sinking of the balls the attendant may get a good idea of the viscosity of the sample as compared with the norm or standard in the comparison chamber 10. At the same time the attendant may in the usual manner ascertain the depth of the oil in the crank-chamber by noting the oil-smear on the exterior of the tube 5, this exterior being graduated in the usual manner to assist in determining the exact depth of the oil. By providing slots 6 on opposite sides of the tube 5 the two oil samples are sufficiently illuminated to permit the attendant to readily observe the movement of the balls and as stated, compare their respective movements in the matter of speed of sinking. It will be readily understood, of course, that the slots 6 will not be wide enough to permit the lower ball 12 to escape when the tube is raised from the seat 13.

Another partition 15 is affixed in the tube 8 at a distance from the partition 14 and about equal to the distance between the partition 14 and the seat 13. The upper end of the tube 8 is closed by stopper 16 thereby forming a short chamber 17 between this stopper 16 and the partition 15. The small bore tube 18 extends down through the stopper 16 and through the partition 15 to thereby permit a slight quantity of oil to ooze out of the comparison chamber 10 when the oil is expanded by heat, the tube 18 being provided with bleed openings 19 to let the oil freely flow up into the chamber 17. The upper end of the tube 18 is open to the atmosphere to avoid air compression in the chamber 17 and the bore of the tube 18.

The glass tube 8 is raised and lowered, for the purpose above set forth, by means of the tube 18 whose upper end is affixed, by means of a set-screw 20 tapped through a collar 21, this collar being provided with a lateral arm 22 which is provided with a depending pin 23 whose lower end if guided in a sleeve 24 affixed to the upper end of the metal tube 5. A handle or finger-hook 25 is affixed to the upper end of the metal tube 5.

To hold the glass tube normally in its upper position I provide a coiled expansible spring 26 which is arranged between the collar part 21 and a stopper 27 fitted into the upper end of the metal tube 5. A metal tube 28 surrounds the air tube 18 and has its lower end affixed to the upper end of the glass tube and the stopper 16, its upper end being abutted against the under-side of the collar 21. A short guide tube 29 is affixed in a collar 27, but of course this tube may be done away with if desired as it performs no function other than to assist in guiding the tube 28 in its up and down movements.

In using this appliance, it is desirable to let it hang in the crank-case at least long enough to insure the heating of the standard oil body in 10 to the same degree as the oil in the crank-case, as for accurate testing it is, of course, desirable that the oil in the chambers 10 and 11 shall be of the same temperature. Then the operator puts one finger under the hook 25 and presses down on the plate 22 with another finger to thereby compress the spring 26 and seat the glass tube against the seat 13, thereby trapping a sample of the crank-case oil in the chamber 11. After the testing operation, the lower end of the instrument is inserted back into the crank-case and the finger-plate 22 is released, whereupon the spring 26 automatically raises the glass tube to permit the oil in the sample chamber 11 to run out into the crank-case.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. It will be understood that when the implement is inverted for the testing operation the oil in chamber 10 will not run out through the open tube 18 as there is no way for air to get into the chamber to take the place of the oil, and besides the bore of the tube 18 will be very small to thus insure against leakage.

I claim:

1. In a viscosimeter, a casing-tube provided with a longitudinal slot or slots and a valve seat at its lower end, a glass tube enclosed in said casing-tube and slidingly mounted therein to enable its lower end to be seated against said valve seat and to be raised above the same to permit oil to enter the lower end of the glass tube, a partition in said glass tube intermediate its ends, another partition in said glass tube at its upper end, to thereby form a chamber for standard oil, a non-buoyant body in each one of said chambers, and means whereby said glass tube may be moved either upwardly or downwardly away from or toward said valve seat, for the purpose set forth.

2. The structure recited in claim 1, an air-escape hole being provided in the glass tube at a point below said intermediate partition.

3. The structure recited in claim 1, the means for raising and lowering the tube embodying a spring for normally holding the tube in its up position and manually operated means for forcing the tube to its down position and holding it there while the testing operation is taking place.

4. The structure recited in claim 1, an oil-escape chamber being provided in the glass tube above the upper partition, a tube passing through said upper partition and communicating with said oil-escape chamber and a stopper inserted in the upper end of the glass tube.

5. The structure recited in claim 1, an oil-escape chamber being provided in the upper end of the glass tube, a stopper inserted in said upper end and a tube extending through both the stopper and the partition and provided with perforations in communication with said oil-escape chamber.

6. The structure recited in claim 1, the means for raising and lowering the glass tube comprising a metal tube connected to the upper end of the glass tube and extending down through the upper partition, a finger-piece attached to the upper end of this metal tube, a coil spring underneath said fingerpiece tending to raise the same and its attached metal tube, and an abutment for the lower end of this coil spring affixed to the upper end of the casing tube.

JOHN MONTGOMERY BELL.